United States Patent
Barnes

[19]

[11] Patent Number: 5,892,975
[45] Date of Patent: *Apr. 6, 1999

[54] SYSTEM FOR WAKE-UP MODULE ON PC CARD DETECTING SWITCHES HAD ACTUATED AND CAUSING IMAGE TO DISPLAY TO APPEAR THAT WAS DISPLAYED WHEN TURNED OFF

[75] Inventor: Thomas J. Barnes, Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 811,137

[22] Filed: Mar. 3, 1997

Related U.S. Application Data

[63] Continuation of Ser. No. 455,561, May 31, 1995, abandoned.

[51] Int. Cl.⁶ .................................................. G06F 9/02
[52] U.S. Cl. .............................. 395/838; 395/892
[58] Field of Search .................... 395/501; 235/384; 359/152, 172, 189; 345/329

[56] References Cited

U.S. PATENT DOCUMENTS

| | | | |
|---|---|---|---|
| 4,764,984 | 8/1988 | Franke et al. ............................. | 359/172 |
| 4,814,591 | 3/1989 | Nara et al. ................................ | 235/280 |
| 5,075,792 | 12/1991 | Brown et al. ............................ | 359/152 |
| 5,122,643 | 6/1992 | Gamou et al. ........................... | 235/384 |
| 5,233,547 | 8/1993 | Kapp et al. ........................... | 364/705.02 |
| 5,278,673 | 1/1994 | Scapa et al. ............................ | 358/473 |
| 5,293,424 | 3/1994 | Holtey et al. ............................. | 380/23 |
| 5,451,933 | 9/1995 | Stricklin et al. .................. | 340/825.06 |
| 5,486,687 | 1/1996 | Le Roux ................................ | 235/382 |
| 5,495,358 | 2/1996 | Bartig et al. ............................ | 359/189 |
| 5,500,517 | 3/1996 | Cagliostro ............................... | 235/486 |
| 5,521,369 | 5/1996 | Kumar ..................................... | 235/472 |
| 5,522,089 | 5/1996 | Kikinis et al. .......................... | 395/893 |
| 5,528,758 | 6/1996 | Yeh ......................................... | 395/821 |
| 5,539,658 | 7/1996 | McCullough ........................... | 345/329 |
| 5,608,863 | 3/1997 | Ishizawa et al. ....................... | 395/501 |

FOREIGN PATENT DOCUMENTS

WO 93/0950  5/1993  WIPO .

OTHER PUBLICATIONS

"Method for Displaying Directories of Images", IBM Technical Disclosure Bulletin, vol. 30, No. 11, p. 257, Apr. 1988.

Primary Examiner—Thomas C. Lee
Assistant Examiner—Anderson I. Chen
Attorney, Agent, or Firm—Blakely, Sokoloff, Taylor & Zafman LLP

[57] ABSTRACT

A method and apparatus for displaying images and/or reproducing sound on a PC card. According to one aspect of the invention, a PC card is disclosed that includes an interface to a data processing device to obtain data representing a set of one or more images from the data processing device. The PC card further includes a memory to store the data, and a display to display the set of images. According to another aspect of the invention, the data may represent sound data, which could be processed by circuitry included in the PC card to reproduce sound. According to yet another aspect of the invention, a method for displaying images on a PC card is provided, by storing a first set of data representing a set of one or more images to a storage area of the PC card, and displaying the set of one or more images on a display of the PC card. According to another aspect of the invention, a method is provided for transferring sound data to the PC card for sound reproduction by the PC card.

12 Claims, 6 Drawing Sheets

SYSTEM FOR WAKE-UP MODULE ON PC CARD DETECTING SWITCHES HAD ACTUATED AND CAUSING IMAGE TO DISPLAY TO APPEAR THAT WAS DISPLAYED WHEN TURNED OFF

CROSS-REFERENCE TO RELATED APPLICATIONS

This is a continuation of application Ser. No. 08/455,561, filed May 31, 1995, now abandoned.

Please refer to co-pending application Ser. No. 08/391,133 entitled STAND ALONE PC CARD WITH I/O CAPABILITY filed on Feb. 21, 1995 by Steere, et. al., now abandoned and assigned to the same assignee as the present invention.

BACKGROUND OF THE INVENTION

1. Field of the Invention

The subject invention relates to small form factor electronic image storage and display devices. More particularly, it relates to the use of a limited function printed circuit card ("PC card") based computer to access, store and display graphical images and associated soundtracks.

2. Description of the Prior Art

Very small computers, sometimes called personal digital assistants, are now available. These devices are general purpose. They perform data presentation, data entry, calculation and data storage. They often include access to various memory and communication devices such as modems and an interface to the cellular telephone network. These devices are used to carry personal calendars, addresses, phone numbers and the like. The personal digital assistants are currently the smallest portable computer. They measure approximately 6 inches by 4 inches by 1 inch However, for some applications, they are still quite large. For example, it would be desirable to have an electronic device that would fit into a shirt pocket and be not much thicker than a few credit cards. Such a device could be used to store and display graphic images and sound tracks. The graphic images would be the materials stored in a typical wallet such as family pictures and business cards. Other information such as medical records or slides for a presentation could also be stored.

SUMMARY OF THE INVENTION

A method and apparatus for displaying images on a PC card are provided. According to one aspect of the invention, a PC card is disclosed that includes an interface to a data processing device to obtain data representing a set of one or more images from the data processing device. The PC card further includes a memory to store the data, and a display to display the set of images. According to another aspect of the invention, the data may represent sound data, which could be processed by circuitry included in the PC card to reproduce sound.

According to yet another aspect of the invention, a method for displaying images on a PC card is provided, by storing a first set of data representing a set of one or more images to a storage area of the PC card, and displaying the set of one or more images on a display of the PC card. According to another aspect of the invention, a method is provided for transferring sound data to the PC card for sound reproduction by the PC card.

BRIEF DESCRIPTION OF THE DRAWING

The preferred embodiments will now be described in connection with the drawing in which.

DESCRIPTION OF THE PREFERRED EMBODIMENT

The preferred embodiment of the present invention uses the PCMCIA form factor. The PCMCIA (Personal Computer Memory Card International Association) standard specifies a card containing a printed circuit board. This product is usually referred to as a PC card. There are three PC card formats: Types I, II and III of which type I is the most suitable for the present invention. The dimensions of a type I PCMCIA card are 54 millimeters long, 85.6 millimeters wide and 3.3 thick. The standard specifies a 68 pin connector on one end which may be plugged into a socket in a host computer. That is, the 68 pin connector plugs into a mating connector mounted on a header which is in turn mounted to a mother board or daughter board located inside the host. The host provides the power to run the functionality of the PC card. The term interface means at least an electrical and mechanical connector conforming to a published specification. In addition, an interface may include a physical size specification so that the entire system will fit into a specified space. Examples of such standards are the PCMCIA standard and the Smart Card standard. The RS 232 serial interface standard and the parallel interface standard are connector and data protocol standards only. Physical dimensions of the systems to be interfaced are not specified. While the preferred embodiment will be described by using the PCMCIA electrical interface standard, the invention herein applies equally to the Smart Card standard as well as a serial interface such as that specified by the RS 232 standard or a parallel interface to a host computer.

Figure 1:
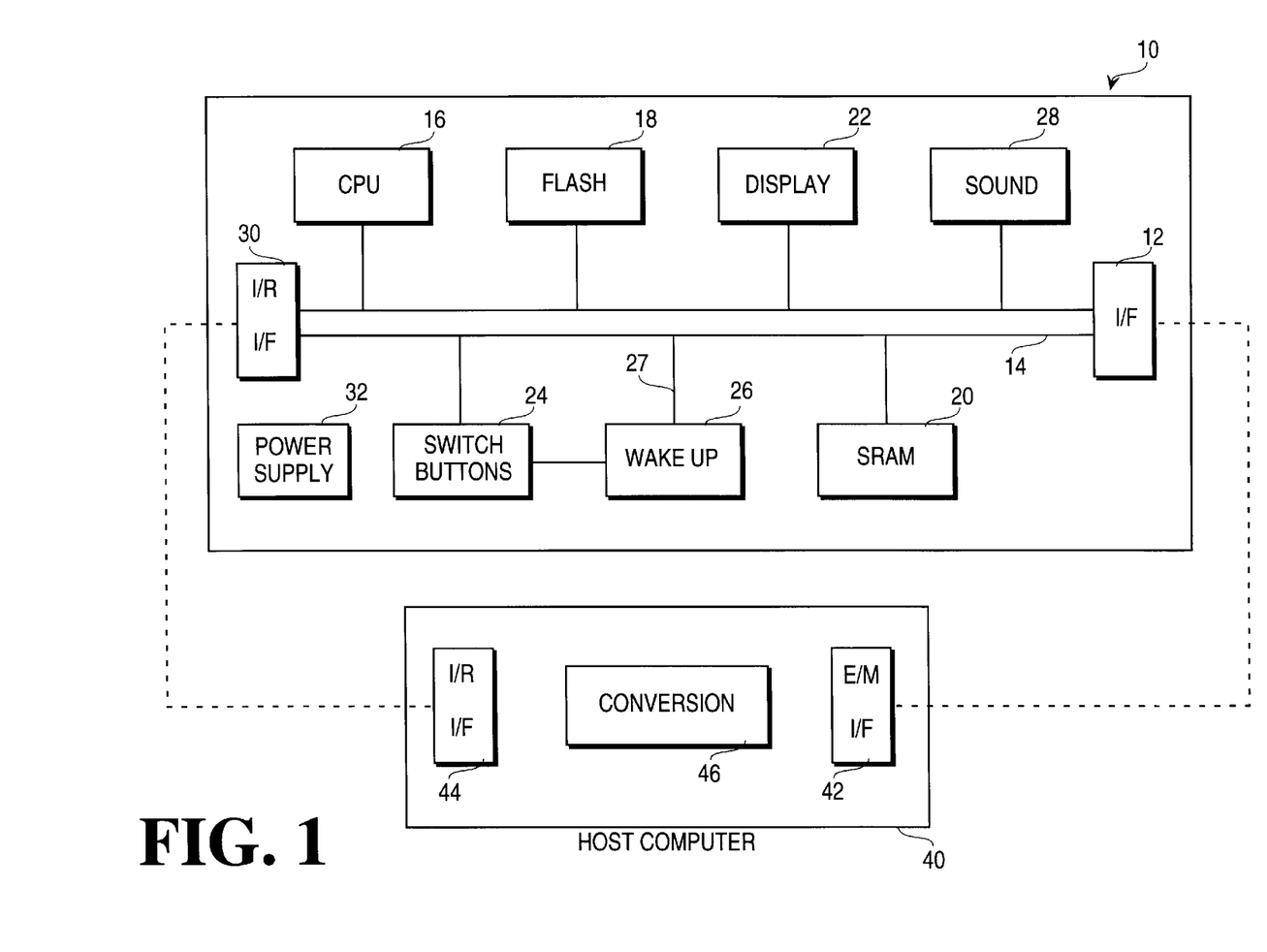
FIG. 1 is a block diagram of the system of the present invention.

FIG. 1 is a block diagram of the basic system architecture of the present invention. Referring now to FIG. 1, reference numeral 10 indicates a PCMCIA card. A mechanical and electrical interface 12 is connected to bus 14. Interface 12 may be a 68 pin connector and bus 14 may be the PCMCIA specified bus or a different bus such as the ISA bus or the 186AD bus.

CPU 16 is connected to bus 14. A suitable CPU is microcontroller model 80C188EB manufactured by Intel Corporation.

Flash memory module 18 is connected to bus 14. A typical flash memory module is model PA28F800BX-TL80 manufactured by Intel Corporation.

Static random access memory ("SRAM") module 20 is connected to bus 14. A typical SRAM module would be 32k bytes or 64k bytes in capacity. As is well known, SRAM is a low power consumption memory. A suitable SRAM memory module would be KMB681000ALT-8 manufactured by Samsung.

A display device 22 is also connected to bus 14. Device 22 is a liquid crystal display ("LCD") measuring approximately 58 mm by 34 mm and having either 140 lines and 240 columns or 144 lines and 256 columns. As is well known, LCD's are very low power devices.

An interface 24 for a set of button switches is also connected to bus 14. Button switches will be used to scroll through an image data base and input simple commands.

A wakeup module 26 has its input connected directly to button switches 24 and its output connected by data path 27 to bus 14. Wakeup module 26 is low power circuitry that is always active and detects the pressing of switch 24.

Sound component 28 includes a speaker, a digital to analog ("D/A") converter, and a small audio amplifier. A preferred speaker would be a piezoelectric transducer which is very small and consumes very little power.

In addition to electrical interface 12, wireless interface 30 is connected to bus 14 and consists of an infrared ("I/R") transceiver and may also be used to communicate with external devices.

Power supply 32 provides power to run all of the components on PC card 10. Either a primary or a secondary battery could be used. The specific connections of power supply 32 to the various components are well known and are not shown to avoid clutter. Power supply 32 would typically be a lithium battery.

PC card 10 is designed to mate with a host computer 40 of conventional design. Host 40 includes a CPU, RAM, mass storage such as a hard disk, I/O capability, an operating system, etc. In addition, host 40 contains an electrical and mechanical interface 42 for communication through interface 12 to PC card 10; and a wireless interface 44 for communicating via wireless media with wireless interface 30 of PC card 10.

Host 40 also includes conversion mechanism 46. In operation, images are stored in host 40 which could acquire such images by a scanner, or receive them over data links such as a LAN. Images could also be generated by the host computer as in the case of a business card. Images in the host are formatted to be readily displayed on the display of the host. However, because the display of the host is most likely different than display 22 of PC card 10, a conversion mechanism, such as a program, is required to convert the images in the host to a format that can be directly displayed on display 22 of PC card 10. The images would be converted in host 40 and sent as a bit map to PC card 10 where they would be stored in flash memory 18. Alternatively, the images could be converted in host 40 and sent as a compressed bit map to PC card 10. The advantage of sending the images as a compressed bit map is to store more images in a given size flash memory. It may be desirable to imbed a version of the conversion mechanism in the form of a software program in flash memory 18 of PC card 10. This would allow one user to upload the software program into a second persons card with the same or similar functionality but having a different screen driver. This would alleviate carrying around a floppy disk with the conversion software.

The user controls the functions of PC card 10 through button switches. In a typical implementation, when not in use, the system would have all of its components turned off except for wake up module 26. On the first press of a button switch, detection circuitry in wake up module 26 detects that the switch has been pushed and activates the systems of PC card 10 by sending a signal across signal path 27 to the remainder of the system.

SRAM memory element 20 stores the state of the system of PC card 10 as it is powered down. When the system is activated, the image that was displayed immediately before the system was shut down is again displayed.

Images stored in host 40 may be transferred to PC card 10 either via electrical interface 12 or wireless interface 30. If the transfer is via an electrical interface, the images are stored in flash memory 18. If the transfer is via wireless interface, the images are stored in SRAM 20. A user may display any image on display 22 by pressing the button switches appropriately.

Figure 2:
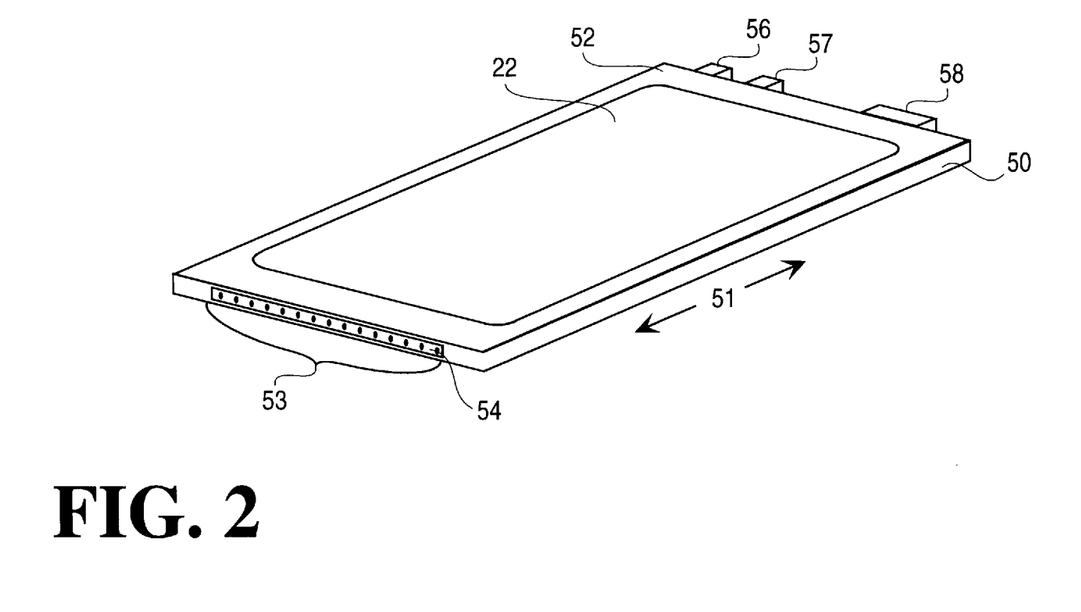
FIG. 2 is a perspective of the PC card showing the top thereof.

FIG. 2 is a perspective of PC card 10 showing the top thereof. Referring now to FIG. 2, PC card 10 includes a frame 50 having a long dimension 51 and a short dimension 53. Frame 50 surrounds a printed circuit board (not shown) which contains the system of FIG. 1. A top cover 52 which mechanically protects the printed circuit board is attached to frame 50. Display 22 is positioned on and attached to top cover 52 and is electrically connected to the printed circuit board. Connector 54 is attached along a short dimension of frame 50 on the surface that is at right angles to top cover 52 and is interface 12 of FIG. 1. Two button switches 56 and 57 are positioned on the short dimension of frame 50 opposite connector 54 and are electrically connected to the printed circuit board. Positioned adjacent to button switch 57 is an I/R window 58 for allowing I/R radiation to communicate with wireless interface 30 which is located on the printed circuit board and electrically connected to bus 14 in FIG. 1.

There may be any number of button switches. In the preferred embodiment there are two switches, 56 and 57. The switches enable the user to scroll through an image data base and enter commands.

An image data base may consist of any number of images. The exact number would be determined by the image format and the size of flash memory 18. On objective is to rapidly find the image of interest. In the preferred embodiment, an identifying name is given to each image, and an image directory is stored in SRAM 20. For example a picture of the user's wife could be labeled WIFE or WF1. Children could be labeled CHILD or CH1 or CH2, etc.

Figure 3:
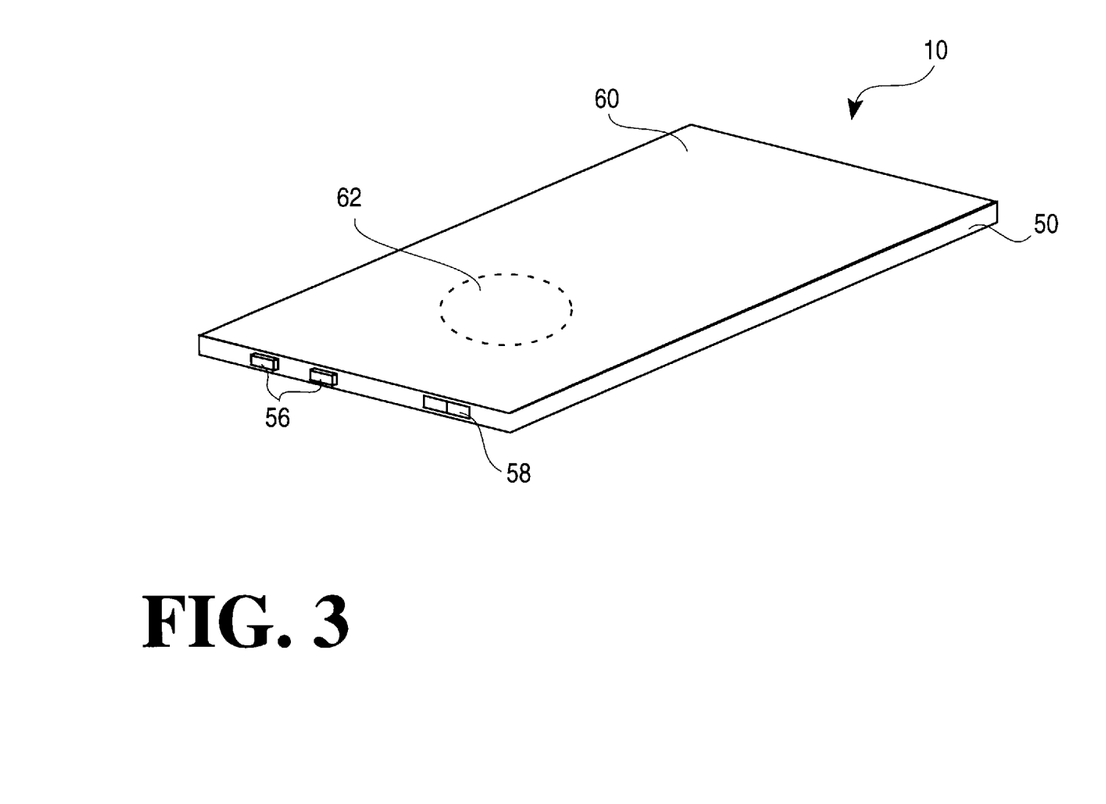
FIG. 3 is a perspective view showing the bottom of PC the card.

FIG. 3 is a perspective view showing the bottom of PC card 10. Referring now to FIG. 3, a bottom cover 60 which mechanically protects the printed circuit board is attached to frame 50. A speaker or sound transducer 62 is positioned on bottom cover 60 and is an integral part of sound component 28 of FIG. 1. In use, sound would be associated with images. This would be accomplished by creating an audio track which is a companion of the image file. If sound is being down loaded from host 40, the size of the audio track is clipped at a predetermined size to optimize memory space. The clipping function resides in conversion mechanism 46.

Figure 4:
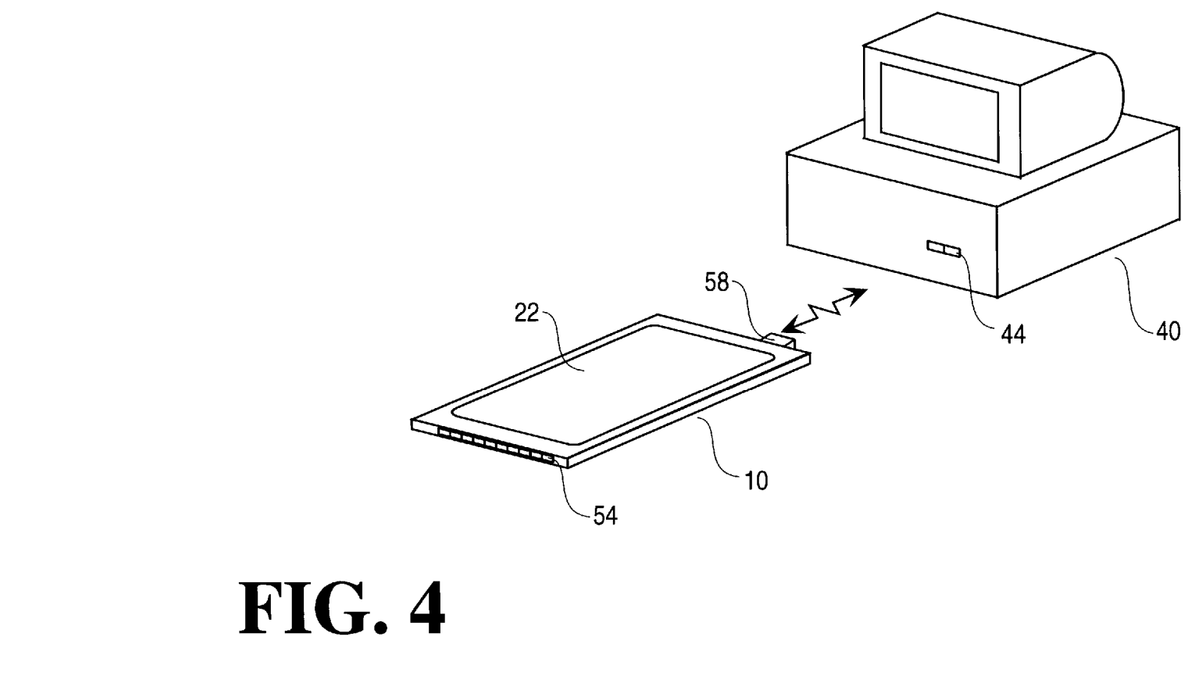
FIG. 4 is a perspective of the PC card and its host computer.

FIG. 4 is a perspective view of PC card 10 and its host 40. Referring now to FIG. 4, host 40 contains an I/R window 44 through which I/R radiation is passed. Within host 40 an I/R transceiver of conventional design (not shown) is incorporated into the host computer system and through which the host may communicate with other external devices. PC card 10 contains an I/R window 58 through which I/R radiation is passed to wireless interface 30 and through which the system of PC card 10 may communicate with host 40.

Figure 5:
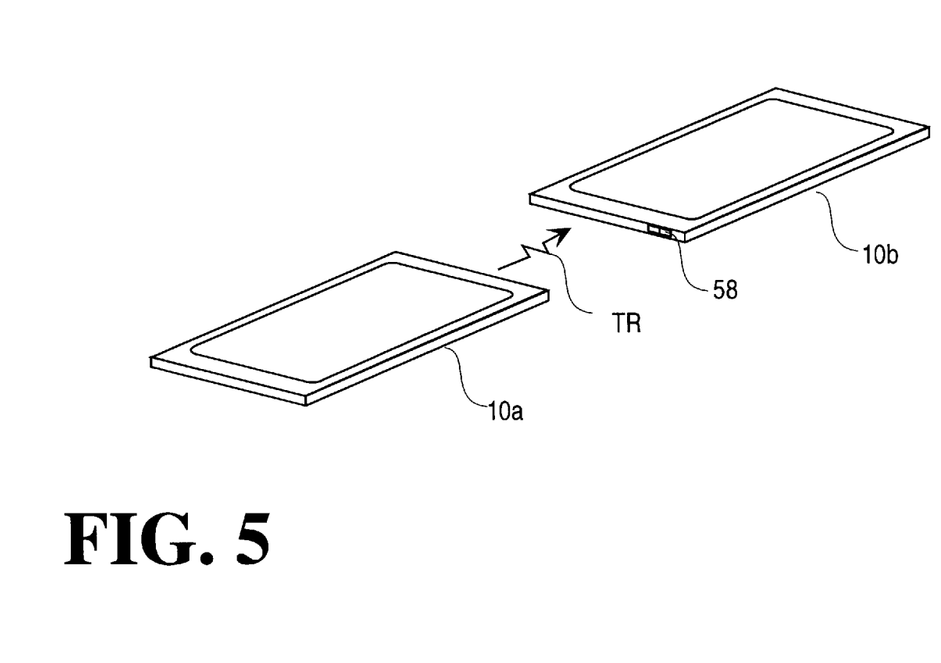
FIG. 5 is a perspective view of two cards in a stand alone environment communicating with each other.

FIG. 5 is a perspective view of two cards 10a and 10b in a stand alone environment communicating with each other. Each of cards 10a and 10b contain I/R transceivers and can transfer images to each other upon command by a user. This feature is useful in transferring business cards. In practice, a user holding PC card 10a would bring up the image to be transferred and then push button switch 56 and/or 57 appropriately and thereby cause the image on the screen of PC card 10a to be transmitted via its I/R transceiver to the I/R transceiver of PC card 10b. Images so transferred would be stored in SRAM 20. In this way business cards are exchanged electronically between persons.

Figure 6:
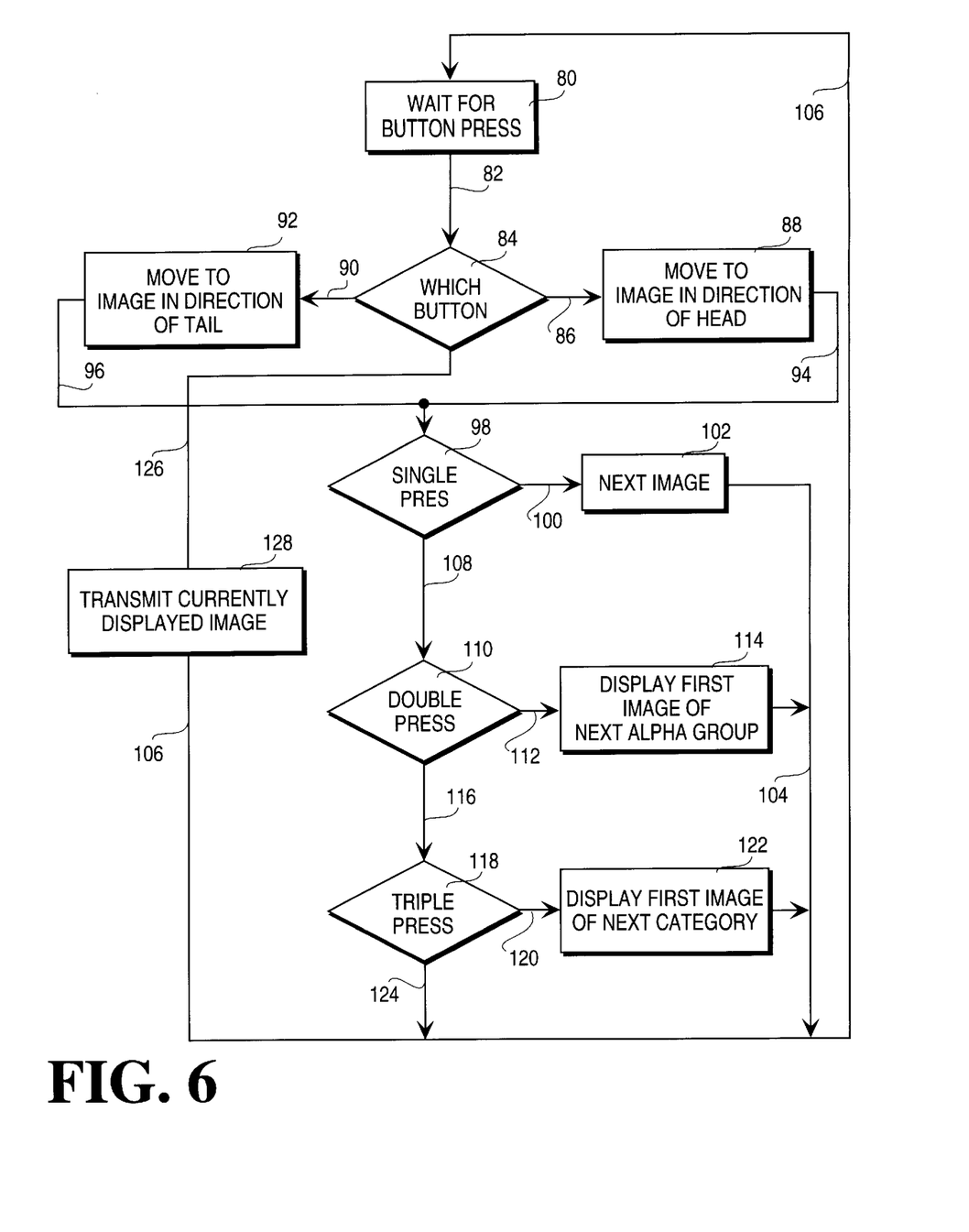
FIG. 6 is a flow chart of the preferred process for efficiently reaching the desired image.

FIG. 6 is a flow chart of the preferred process for efficiently reaching a desired image. Referring now to FIG. 6, processing block 80 marks the beginning and idle state of the process. At processing block 80, wait for a button to be pressed. When a button or buttons are pressed, proceed by process path 82 to decision block 84 to determine which button or combination of buttons were pressed. If button 56 were pressed, proceed by process path 86 to processing block 88 and store for subsequent reference that scrolling through the image directory will be towards the head (start) of the image directory or list. If button 57 is pressed, proceed by process path 90 to processing block 92 and store for subsequent reference that scrolling through the image directory will be towards the tail (end) of the image directory or list.

Next, follow either process path 94 or 96 to decision block 98 and determine the number of presses at decision block 98. If a single press, proceed by process path 100 to processing block 102 to display the next image. By next image is meant moving in the direction selected at decision block 84. That is either towards the head or tail of the image directory. Next, proceed by process path 104 and 106 to processing block 80 to wait for the next button sequence.

Referring back to decision block 98, if it is not a single press, proceed by process path 108 to decision block 110. At decision block 110, if it is a double press, proceed by process path 112 to processing block 114 to display the first image of the next alphabetical grouping. By alphabetical grouping is meant all names of images that start with a particular letter such as "A". By next alphabetical grouping is meant the next alphabetical group moving in the direction selected at decision block 84. Next proceed by process paths 104 and 106 to process block 80 and wait for the next button sequence.

Referring back to decision block 110, if it is not a double press, proceed by process path 116 to decision block 118. If it is a triple press, proceed by process path 120 to process block 122 to display the first image of the next category groping. By category grouping is meant logical groups such as personal pictures, business cards, presentation notes, etc. In an alphabetically sorted group, it may mean a move to the next group of some number of letters, to facilitate fast movement through the alpha-sorted group. By next category grouping is meant the next alphabetical group in moving in the direction selected at decision block 84. Next proceed by process paths 104 and 106 to process block 80 and wait for the next button sequence.

Referring back to decision block 118, if it is not a triple press, proceed by process path 124 and 106 to process block 80 and wait for the next button sequence.

Referring back to decision block 84, if both buttons are pressed simultaneously, proceed by process path 126 to processing block 128 to transmit the currently displayed image via the I/R transmitter. Upon completion of transmission, proceed by process path 106 to processing block 80 and wait for the next button sequence.

The foregoing preferred embodiments are subject to numerous adaptations and modifications without departing from the concept of the invention. Therefore, within the scope of the appended claims, the invention may be practiced other than as specifically described herein.

What is claimed is:

1. A pc card comprising:
   a display;
   a memory storing images and a directory for identifying said images;
   an interface for transferring said images between a host computer and said pc card;
   accessing switches mounted on said pc card for selecting an image from said image directory and causing said selected image to appear on said display; and
   a wake up module on said pc card, said wake up module:
   (a) causing components on said pc card other than said wake up module to turn off a predetermined time after the last use of said pc card;
   (b) detecting that at least one of said switches has been actuated and turning on said previously turned off components as a result thereof; and
   (c) causing the image being displayed when said components were turned off to appear on said display when said components are turned on.

2. The system of claim 1 wherein said interface for transferring images from said host to said portable computer is a wireless interface.

3. A system comprising:
   pc card having:
   (a) a display;
   (b) memory storing digital data representing images and sound tracks associated therewith and a directory of said images and associated sound tracks for identifying said images and associated sound tracks;
   (c) an interface for transferring said images between a host computer and said pc card;
   (d) accessing switches mounted on said pc card for selecting an image from said image directory and causing said selected image to appear on said display; and
   (e) a sound component for producing sound output from said digital data representing sound tracks; and
   a host computer having:
   (a) a memory for storing digital data representing images and associated sound tracks;
   (b) an interface for transferring said images and associated sound tracks to and from said pc card; and
   (c) a conversion mechanism for converting images in said host to a format for display directly on said display and for clipping said sound tracks to a predetermined size.

4. The system of claim 3 further including said conversion mechanism in said pc card memory for uploading to a second host computer.

5. The system of claim 3 wherein said access switches comprise no more than two switches.

6. The system of claim 3 wherein said interface for transferring images from said host to said portable computer is a wireless interface.

7. A method comprising the steps of:
   storing data representing images and associated sound tracks in a host computer memory;
   converting said data representing said image to a predetermined image format;
   clipping said associated sound tracks to a predetermined length;
   transferring data representing said converted images and said clipped sound track to a pc card having memory and a display requiring said predetermined image format;

storing said data representing said converted images and said clipped sound tracks in memory in said pc card;

displaying said images on said pc card display and playing said associated sound tracks through sound reproduction components on said pc card.

8. The method of claim 7 further including associating a directory name with each of said images and accessing said images in said pc card by accessing said associated directory name.

9. The method of claim 7 wherein said step of accessing said images in said pc card by accessing said associated directory name comprises pressing predetermined sequences of no more than two switches located on said pc card.

10. The method of claim 7 further including the step of capturing electronic images in said host computer.

11. The method of claim 7 wherein said step of capturing electronic images in a host computer comprises scanning said images.

12. The system of claim 7 wherein said interface for transferring images from said host to said portable computer is a wireless interface.

* * * * *